Oct. 14, 1941.  E. WILLNER  2,258,836
CATHODE HEATER
Filed June 19, 1940
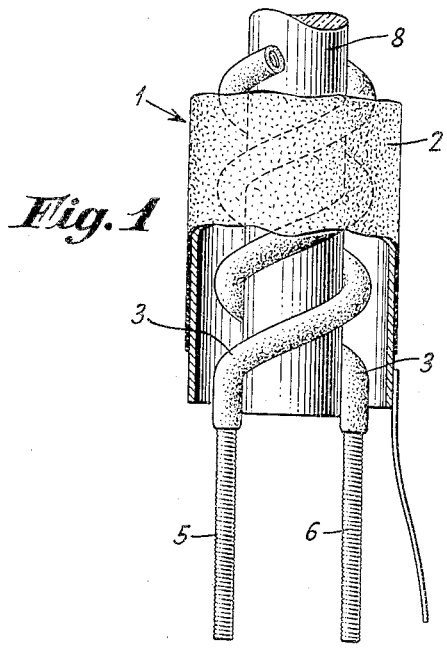
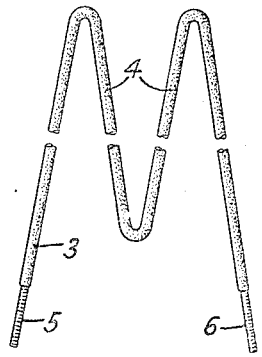
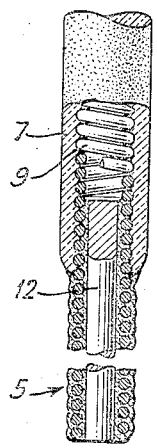
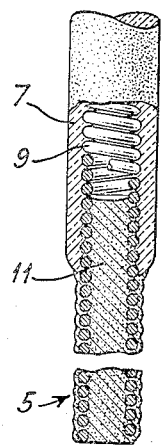
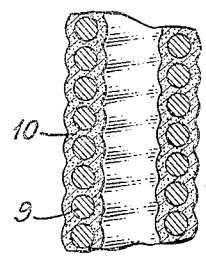
INVENTOR
ERNST WILLNER
BY Charles McClain
ATTORNEY Patented Oct. 14, 1941

2,258,836

UNITED STATES PATENT OFFICE 2,258,836

CATHODE HEATER

Ernst Willner, Berlin, Germany, assignor to Telefunken Gesellschaft für Drahtlose Telegraphie, m. b. H., Berlin, Germany, a corporation of Germany Application June 19, 1940, Serial No. 341,260
In Germany June 29, 1939

5 Claims. (Cl. 250—27.5)

This invention relates to cathodes, particularly to heaters for indirectly heated cathodes.

Indirectly heated cathodes usually consist of a metal sleeve coated on the outside with an emitting layer and with an interior heating element which consists of a filament with relatively heavy ceramic insulation. The metal sleeve and the heating structure are separately supported, the heating structure being supported only by the ends of the filament protruding from the insulation. If the cathode is to be operated with a heating voltage higher than 20 volts, the wire is very small and is not strong enough to support the entire heating structure. No practical means is known for attaching the heater to the sleeve.

The object of this invention is to stiffen the ends of the heater wire. In accordance with the present invention, a heater wire is wound into a coil and the ends of the coil are stiffened by soldering the turns together. If desired, a metal core wire or core rod may be introduced in each end of the coil, and the core and coil soldered or brazed together. The stiffened coil may extend into the insulating body of the heating structure.

In accordance with the present invention rigid supporting terminals are provided for the heating structure although the heating wire may be very fine. By preventing movement of the heating structure in the sleeve, noise disturbances are avoided. Furthermore, fractures of the filament at the places not covered by the insulating layer can be prevented, and owing to the increased conducting cross section the heat and emission from the uncovered ends of the coil will be so low that hum and disturbances cannot be caused by the ends of the filament. The solder or brazing material stiffens the ends of the coil without damage to the fine wire and protects the wire from mechanical damage during handling and welding.

The solder or brazing metal of the intermediate layer should consist of a metal which has a low vapor pressure at the temperatures employed in manufacture and in operation and should have a lower melting point than the coil and the core wire. If a brazing metal is chosen whose melting point is not lower than that of the individual parts, it is advisable to bake-on or sinter the metal.

Preferably the soldering metal is chosen which does not form an alloy with the metals to be joined and more especially with the metal of the heating coil, particularly an alloy having a lower melting point than the soldering metal proper. In many cases a copper-silver-tin alloy was found to be favorable.

The high melting solder can be applied to the heating wire electrolytically or in accordance with the usual "tinning" process, and the solder may be applied to the ends of the wire before or after winding. The core wire, when used, may also be "tinned" or otherwise coated with the solder. The end turns of the coil can be fixedly joined to form a rigid cylinder by subjecting the turns to a brief period of glowing in vacuum or in a reducing gas or inert gas at a temperature lying within the melting temperature of the solder.

The characteristic features of my invention are defined in the appended claims and preferred embodiments are described in the following specification and shown in the accompanying drawing in which—

Figure 1 is a sectional view of an indirectly heated cathode embodying my invention;

Figure 2 shows a folded type of heating element embodying my invention;

Figures 3 and 4 are detailed views of the reinforced ends of the heater of my improved element; and Figure 5 is a sectional view of a heating coil stiffened according to my invention.

The indirectly heated cathode sleeve 1 is exteriorly activated with electron emissive material 2 such as a coating of alkaline earth oxides. Means for heating the sleeve to emission temperature may comprise the double helical wound spirals 3 of Figure 1 or folds 4 of Figure 2. A source of electrical potential may be connected to terminals 5 and 6 for heating the sleeve to the desired temperature. Where the heater potential must be as high as 25, 67, or 115 volts, the electrical resistance of the heating element must be correspondingly high for low current consumption, and the wires must be small in cross section and relatively long. For these higher voltages, tungsten wire as small as .001 inch in diameter, may be used; and for compactness of the heating element, these fine wires preferably are wound into small coils as small as .005 inch in outside diameter. The coiled wire may then be wound into double helix as in Figure 1 or folded as in Figure 2 and coated with insulating material. If desired, the double helically wound turns of the heater may be mounted upon an insulating core rod 8 and then the rod and helices sprayed with insulating material to bind the heating elements into a rigid unitary structure. The inside surface of the coated sleeve, which is usually of nickel, is smooth and the entire weight of the heating element must be carried by the connectors fastened to the terminals 5 and 6 of the heater. But since these turns are of fine wire, the weight of the heating element may break the wire. Further, the fine wire is difficult to weld, because of its size, to its connectors.

According to this invention the end turns of the heating coil at the terminals 5 and 6 are stiffened so that they can be handled and welded without breakage and so that the terminals can support the heating structure. According to one embodiment of my invention the adjacent convolutions of the end turns of the heating wire 9 are joined together by fillets 10 of metal adhesively secured to the convolutions by soldering or brazing. The soldering material may be applied to the wire before it is wound into its coils and before the insulating material is applied; or the soldering material may be applied after the heating element has been completed. A high temperature nickel solder applied to tungsten wire, for example, may be heated in an inert or reducing atmosphere or in a vacuum to a temperature at which the solder will flow and wet the tungsten. Soldering fluxes may, of course, be used to facilitate the soldering process. Alternately, the terminals 5 and 6 may be dipped into a melt of the solder and the solder drawn into the end turns by capillary action. Where the inside diameter of the coil is small it may be completely filled by solder as shown at 11 in Figure 4.

A short length of core wire 12 may, if desired, be inserted in the ends of the terminals as shown in Figure 3 and the core brazed or soldered to the turns of the heater. The joined convolutions and stiffened ends of the heater may be extended, if desired, up to or into the space covered by the insulating material 3. The coiled ends of heaters stiffened according to my invention are strong and may be handled without fracturing the fine heater wire and may be joined by welding or crimping in the usual way to the lead-in conductors of the tube. The heater terminals are rigid and will support the heating structure in the sleeve and prevent its longitudinal movement in the sleeve.

I claim:

1. A cathode heater comprising a wire of relatively small size, said wire being wound into a coil, means for stiffening the ends of said coil comprising metal fillets between the turns of the coil at its ends, said fillets being adhesively joined to said turns.

2. An indirectly heated cathode comprising a metal sleeve exteriorly activated with electron emissive material, a heating element in said sleeve comprising a coil of wire with the ends of the coil extending from one end of the sleeve, a coating of insulating material on said coil to electrically insulate said coil from said sleeve, the turns of the extended ends of said coil being secured together to stiffen said ends.

3. An indirectly heated cathode comprising a metal sleeve, a heating element in said sleeve comprising a coil of wire coated with insulating material, means for stiffening the ends of said coil comprising solder material adhesively joining adjacent convolutions of the ends of said coil.

4. A coiled wire for a cathode, the wire being relatively small in diameter, means for stiffening the ends of the coil comprising a mass of metal in the ends of the coil and adhesively joined to each of the turns of the coil at said ends.

5. A heating element for a cathode comprising a coil of wire, a metal core wire extending into each end of the coil, each of the turns of the coil about each core wire being adhesively joined to the core wires.

ERNST WILLNER.